US010464667B2

(12) United States Patent
Combs

(10) Patent No.: US 10,464,667 B2
(45) Date of Patent: Nov. 5, 2019

(54) OBLIQUE ROTOR-WING AIRCRAFT

(71) Applicant: Ampaire, Inc., Temecula, CA (US)

(72) Inventor: Cory Michael Combs, Temecula, CA (US)

(73) Assignee: Ampaire, Inc., Temecula, CA (US)

( * ) Notice: Subject to any disclaimer, the term of this patent is extended or adjusted under 35 U.S.C. 154(b) by 445 days.

(21) Appl. No.: 15/280,961

(22) Filed: Sep. 29, 2016

(65) Prior Publication Data
US 2018/0086445 A1 Mar. 29, 2018

(51) Int. Cl.
*B64C 29/00* (2006.01)
*B64C 3/44* (2006.01)
*B64C 9/00* (2006.01)
*B64C 27/18* (2006.01)
*B64C 27/24* (2006.01)

(52) U.S. Cl.
CPC ............ *B64C 29/0025* (2013.01); *B64C 3/44* (2013.01); *B64C 9/00* (2013.01); *B64C 27/18* (2013.01); *B64C 27/24* (2013.01)

(58) Field of Classification Search
CPC ..... B64C 27/18; B64C 27/24; B64C 29/0025; B64C 3/44; B64C 9/00; B64C 39/08; B64C 27/26; Y02T 50/14; B64D 27/16
See application file for complete search history.

(56) References Cited

U.S. PATENT DOCUMENTS 3,096,041 A * 7/1963 Cheeseman ............ B64C 27/26
244/7 R
3,119,577 A * 1/1964 Andrews ................. B64C 27/26
244/7 R (Continued)

FOREIGN PATENT DOCUMENTS

WO 2004024558 3/2004

OTHER PUBLICATIONS

Stop-Rotor Rotary Wing Aircraft Alter UAV Landscape; URL::http://www.trentonsystems.com/blog/airborne-surveillance/stop-rotor-rotary-wing-aircraft-alter-uav-landscape/ [Retrieved on Sep. 29, 2016] 4 pgs.

*Primary Examiner* — Medhat Badawi
(74) *Attorney, Agent, or Firm* — Sheppard Mullin Richter & Hampton LLP

(57) ABSTRACT

An oblique rotor-wing aircraft may be capable of vertical take-off and landing, subsonic cruise, transonic cruise, and/or supersonic cruise. The oblique rotor-wing aircraft may comprise one or more of a fuselage, a rotor-wing, a thrust-vectored propulsion system, a locking mechanism, and/or other components. The rotor-wing may be rotatably coupled to the fuselage. The rotor-wing may rotate about an axis in a first flight mode for vertical takeoff and landing. The oblique rotor-wing aircraft may include a thrust-vectored propulsion system that drives the rotation of the rotor-wing about the axis. The thrust-vectored propulsion system may include multiple, separately operable propulsion systems coupled to the rotor-wing and/or the fuselage. The oblique rotor-wing aircraft may comprise a locking mechanism that locks the rotor-wing at an angle oblique to the fuselage responsive to initiation of a second flight mode. The rotor-wing may be fixed at an angle oblique to the fuselage during the second flight mode.

19 Claims, 10 Drawing Sheets

(56) References Cited

U.S. PATENT DOCUMENTS

| | | | | |
|---|---|---|---|---|
| 3,149,802 A * | 9/1964 | Wigal | B64C 27/022 | 244/17.11 |
| 3,163,376 A * | 12/1964 | Davidson | B64C 27/26 | 244/7 R |
| 3,237,888 A * | 3/1966 | Willis | B64C 39/001 | 244/23 C |
| 3,296,799 A * | 1/1967 | Fuentes | F02K 9/82 | 239/265.23 |
| 3,370,809 A * | 2/1968 | Leoni | B64C 27/26 | 244/7 R |
| 3,392,857 A * | 7/1968 | Tantlinger | B60P 1/6418 | 180/11 |
| 3,528,630 A * | 9/1970 | Ferris | B64C 27/50 | 244/12.3 |
| 3,762,667 A * | 10/1973 | Pender | B64C 29/0033 | 244/17.19 |
| 3,792,827 A * | 2/1974 | Girard | B64C 27/026 | 244/7 A |
| 3,971,535 A * | 7/1976 | Jones | B64C 3/40 | 244/46 |
| 3,986,686 A * | 10/1976 | Girard | B64C 27/24 | 244/7 A |
| 4,059,247 A * | 11/1977 | Prewitt | B64C 27/28 | 244/102 R |
| 4,071,206 A * | 1/1978 | Magill | B64C 27/50 | 244/17.11 |
| 4,132,374 A * | 1/1979 | Abell | B64C 3/40 | 244/46 |
| 4,335,537 A * | 6/1982 | Walker | A63H 27/12 | 244/7 A |
| 4,434,956 A * | 3/1984 | Gonzales | B64C 27/20 | 244/17.11 |
| 4,469,294 A * | 9/1984 | Clifton | B64C 29/0025 | 244/10 |
| 4,573,871 A * | 3/1986 | Krauss | B64C 27/325 | 244/17.13 |
| 4,691,877 A * | 9/1987 | Denning | B64C 27/26 | 244/207 |
| 4,711,415 A * | 12/1987 | Binden | B64C 27/325 | 244/17.19 |
| 4,730,795 A * | 3/1988 | David | B64C 27/22 | 244/17.21 |
| 4,765,567 A * | 8/1988 | Gutman | B64C 27/02 | 244/17.11 |
| 4,783,023 A * | 11/1988 | Jupe | B64C 27/12 | 244/17.19 |
| 4,789,115 A * | 12/1988 | Koutsoupidis | B64C 27/26 | 244/215 |
| 4,913,376 A * | 4/1990 | Black | B64C 27/02 | 244/17.11 |
| 4,930,724 A * | 6/1990 | Snyder | B64C 31/036 | 244/13 |
| 4,979,698 A * | 12/1990 | Lederman | B64C 29/0033 | 244/17.13 |
| 5,031,857 A * | 7/1991 | MacConochie | B64C 3/40 | 244/3.28 |
| 5,031,859 A * | 7/1991 | Cunningham | B64C 23/00 | 244/12.1 |
| 5,174,523 A * | 12/1992 | Balmford | B64C 27/12 | 244/17.11 |
| 5,421,538 A * | 6/1995 | Vassa | B64C 27/20 | 244/100 R |
| 5,454,530 A * | 10/1995 | Rutherford | B64C 27/24 | 244/22 |
| 5,544,844 A * | 8/1996 | Groen | B64C 27/02 | 244/17.11 |
| 5,707,029 A * | 1/1998 | McIntosh | B64C 9/00 | 244/225 |
| 5,727,754 A * | 3/1998 | Carter, Jr. | B64C 27/02 | 244/17.11 |
| 5,984,635 A * | 11/1999 | Keller | B63H 11/12 | 244/17.11 |
| 6,015,115 A * | 1/2000 | Dorsett | B64C 3/46 | 244/123.11 |
| 6,062,508 A * | 5/2000 | Black | B64C 37/00 | 244/17.11 |
| 6,089,501 A * | 7/2000 | Frost | B64C 27/021 | 244/17.11 |
| 6,234,422 B1 * | 5/2001 | Bolonkin | B64C 27/026 | 244/17.11 |
| 6,340,133 B1 * | 1/2002 | Capanna | B64C 29/0083 | 244/12.3 |
| 6,471,158 B1 * | 10/2002 | Davis | B64C 27/02 | 244/8 |
| 6,622,962 B1 * | 9/2003 | White | B64C 27/26 | 244/12.3 |
| 6,669,137 B1 * | 12/2003 | Chen | B64C 3/40 | 244/7 R |
| 6,848,650 B2 * | 2/2005 | Hoisignton | B60V 1/08 | 244/13 |
| 6,885,917 B2 * | 4/2005 | Osder | B64C 27/18 | 244/10 |
| 6,948,682 B1 * | 9/2005 | Stephenson | B64G 1/14 | 244/36 |
| 7,077,358 B1 * | 7/2006 | Quartarone | B64C 27/82 | 244/17.19 |
| 7,159,817 B2 * | 1/2007 | VanderMey | B64C 29/0016 | 244/12.1 |
| 7,261,257 B2 * | 8/2007 | Helou, Jr. | B64C 1/00 | 244/118.1 |
| 7,434,763 B2 * | 10/2008 | Walliser | B64C 27/24 | 244/17.27 |
| 8,070,090 B2 | 12/2011 | Tayman | | |
| 8,636,241 B2 * | 1/2014 | Lugg | B64C 29/0025 | 244/12.1 |
| 9,120,564 B1 * | 9/2015 | White | B64C 27/473 | |
| 9,284,962 B2 * | 3/2016 | Long | B64C 11/00 | |
| 9,527,577 B2 * | 12/2016 | Embacher | B64C 5/16 | |
| 9,540,103 B2 * | 1/2017 | Long | B64C 27/32 | |
| 9,709,993 B2 * | 7/2017 | Tanahashi | G05D 1/0011 | |
| 9,902,492 B1 * | 2/2018 | Sonneborn | B64C 27/26 | |
| 9,944,387 B2 * | 4/2018 | Vander Lind | B64C 27/26 | |
| 9,975,629 B2 * | 5/2018 | Horn | B64C 27/24 | |
| 10,189,565 B2 * | 1/2019 | Patterson | B64C 37/02 | |
| 2002/0125367 A1 * | 9/2002 | Killingsworth | B60F 3/00 | 244/17.11 |
| 2002/0195518 A1 * | 12/2002 | Killingsworth | B60F 3/00 | 244/7 A |
| 2003/0006339 A1 * | 1/2003 | Capanna | B64C 29/02 | 244/7 R |
| 2005/0045762 A1 * | 3/2005 | Pham | B64C 27/26 | 244/7 R |
| 2007/0095969 A1 * | 5/2007 | Walliser | B64C 3/385 | 244/7 A |
| 2007/0095970 A1 * | 5/2007 | Richardson | B64C 3/385 | 244/7 A |
| 2007/0215748 A1 * | 9/2007 | Robbins | B64C 39/024 | 244/12.5 |
| 2008/0135677 A1 * | 6/2008 | Oleshchuk | B64C 27/18 | 244/17.11 |
| 2009/0045294 A1 * | 2/2009 | Richardson | B64C 3/385 | 244/7 A |
| 2009/0206208 A1 * | 8/2009 | Kennedy | B64C 27/18 | 244/7 A |
| 2009/0242690 A1 * | 10/2009 | Sammy | B64C 29/0025 | 244/12.5 |
| 2009/0250548 A1 * | 10/2009 | Nyhus | B64C 3/385 | 244/6 |
| 2010/0019083 A1 * | 1/2010 | Llamas Sandin | B64C 9/00 | 244/99.14 |
| 2010/0230547 A1 * | 9/2010 | Tayman | B64C 27/24 | 244/7 C |
| 2010/0243820 A1 * | 9/2010 | Lim | B64C 27/24 | 244/7 A |
| 2011/0031355 A1 * | 2/2011 | Alvarez Calderon F. | B64C 3/10 | 244/7 R |

(56) References Cited

U.S. PATENT DOCUMENTS

| | | | | |
|---|---|---|---|---|
| 2011/0180673 A1* | 7/2011 | Lim | ................... | B64C 27/24 |
| | | | | 244/7 A |
| 2012/0280091 A1* | 11/2012 | Saiz | ................... | B64C 27/26 |
| | | | | 244/7 R |
| 2013/0251525 A1* | 9/2013 | Saiz | ................... | B64C 27/26 |
| | | | | 416/23 |
| 2014/0312177 A1* | 10/2014 | Gaonjur | ............. | B64C 27/24 |
| | | | | 244/7 A |
| 2015/0274289 A1* | 10/2015 | Newman | ............ | B64C 27/26 |
| | | | | 244/12.4 |
| 2016/0046369 A1* | 2/2016 | Watkins | ............ | B64C 5/02 |
| | | | | 244/7 A |
| 2016/0200436 A1* | 7/2016 | North | ............... | B64C 29/0033 |
| | | | | 244/7 R |
| 2016/0236774 A1* | 8/2016 | Niedzballa | ........ | B64C 27/30 |
| 2016/0297520 A1* | 10/2016 | Sada-Salinas | .. | B64C 29/0025 |
| 2016/0347446 A1* | 12/2016 | Vetter | .............. | B64C 27/30 |
| 2017/0166302 A1* | 6/2017 | Shiosaki | ........... | B64C 27/14 |
| 2017/0300065 A1* | 10/2017 | Douglas | .......... | G05D 1/0676 |

\* cited by examiner

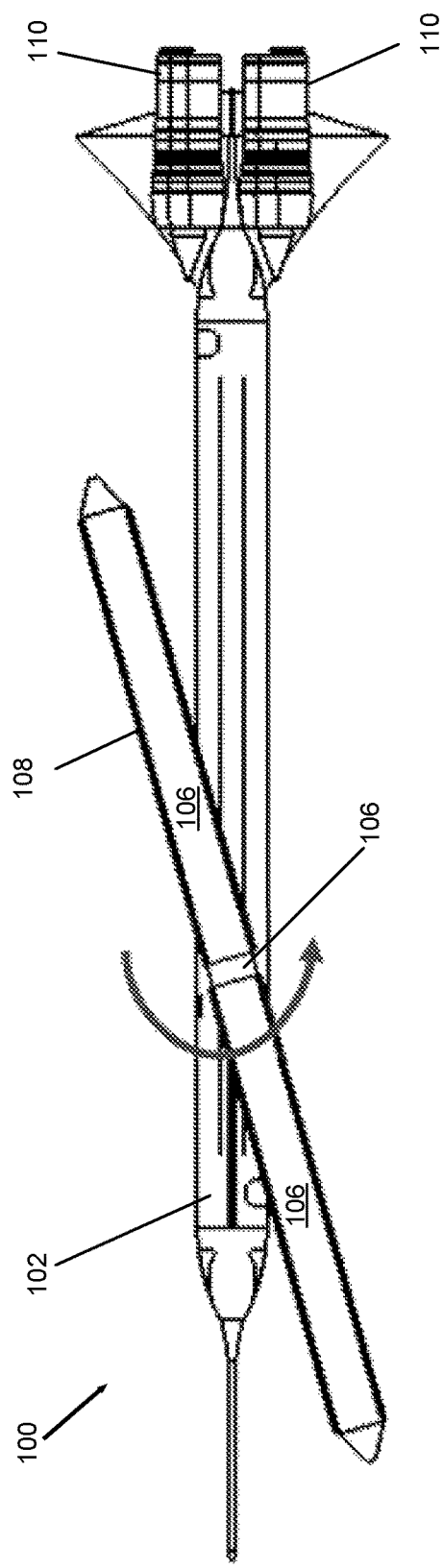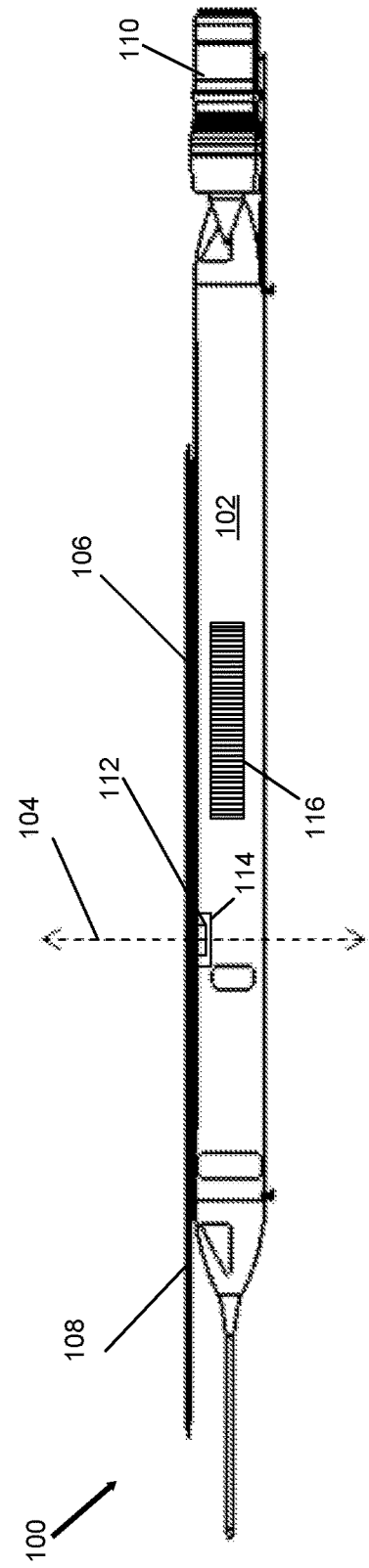
FIG. 1A
FIG. 1B

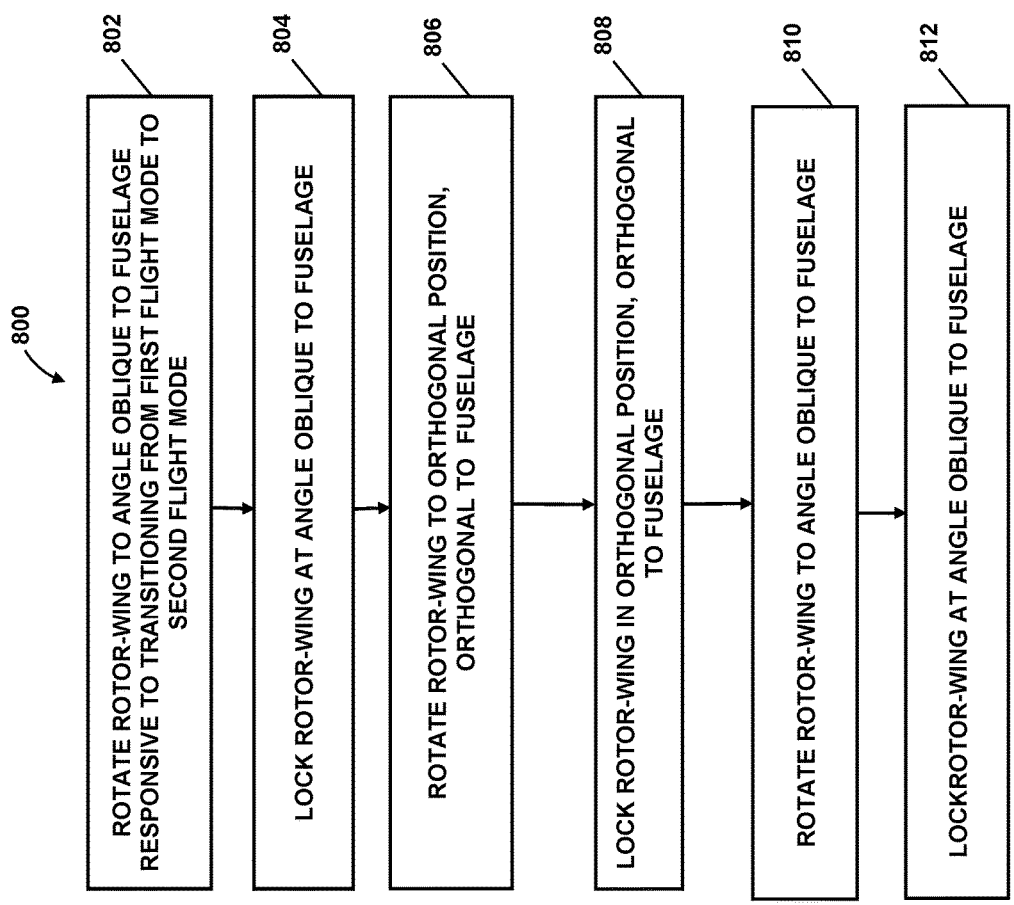

OBLIQUE ROTOR-WING AIRCRAFT

FIELD

The disclosure relates to an oblique rotor-wing aircraft capable of vertical take-off and landing.

BACKGROUND

Typical high speed Vertical Takeoff and Landing (VTOL) aircraft designs have poor hover capabilities. In contrast, helicopters are generally low-speed with high hover capabilities. High-speed VTOL designs require high-powered, heavy weight, highly loaded vertical thrust mechanisms that become dead and/or inefficient weight and lead to excess aerodynamic drag after takeoff during horizontal flight. For aircraft that take off horizontally, overly large propulsion mechanisms are required to generate enough power needed for takeoff. These overly large propulsion mechanisms reduce the efficiency of such aircraft because they add unnecessary weight and drag during cruise flight.

Stop rotor aircraft in which the rotor blades rotate as a helicopter during takeoff and landing, and lock into a position orthogonal to the fuselage, have been narrowly explored as a way to obtain hover capabilities comparable to a helicopter with the efficient horizontal flight of a winged aircraft. However, existing designs struggle to achieve a successful transition between a rotary wing and a fixed wing during flight.

SUMMARY

One aspect of the disclosure relates to an oblique rotor-wing aircraft. The oblique rotor-wing aircraft may be capable of vertical take-off and landing. The oblique rotor-wing aircraft may be capable of subsonic cruise, transonic cruise, supersonic cruise, and/or other regimes of cruising flight speeds. The oblique rotor-wing aircraft may include one or more of a passenger aircraft (e.g., a business aircraft, a commercial aircraft, etc.), an unpiloted cargo aircraft, a piloted cargo aircraft, an unmanned aircraft (e.g., an unmanned aerial vehicle, etc.), and/or other aircraft.

The oblique rotor-wing aircraft may comprise one or more of a fuselage, a rotor-wing, a thrust-vectored propulsion system, a locking mechanism, and/or other components. The rotor-wing may be rotatably coupled to the fuselage. The rotor-wing may rotate about an axis in a first flight mode for vertical takeoff and landing, and/or for hovering. The first flight mode may include one or more rotary flight mode(s) similar to a rotary-wing aircraft (e.g., a helicopter, etc.) wherein one or more rotary wing(s) and/or rotary blades revolve around an axis generating lift and/or thrust, and/or another flight mode. The oblique rotor-wing aircraft may include a thrust-vectored propulsion system. The thrust-vectored propulsion system may include multiple, separately operable propulsion systems. The multiple, separately operable propulsion systems may be located in distinct regions of the aircraft. One or more of the multiple propulsion systems may drive the rotation of the rotor-wing about the axis in a first flight mode. The multiple propulsion systems may include a rotor-propulsion system that drives the rotation of the rotor-wing about the axis to generate lift and/or vertical thrust in a first flight mode (and/or horizontal propulsion in a second and/or third flight mode), and/or a fuselage propulsion system that provides horizontal propulsion (and/or vertical thrust in a first flight mode). As such, the thrust-vectored propulsion system comprising multiple separately operable propulsion systems may decouple lift generation from forward propulsion and/or flight control in the oblique rotor-wing aircraft. The oblique rotor-wing aircraft may comprise a locking mechanism that locks the rotor-wing at an angle oblique to the fuselage responsive to initiation of a second flight mode. During a second flight mode, the rotor-wing may be fixed at an angle oblique to the fuselage. The oblique rotor-wing configuration may enable the rotor-wing aircraft to fly at higher speeds, more efficiently, than existing VTOL aircraft.

The oblique rotor-wing aircraft design described herein may enable vertical take-off and/or landing (VTOL) and/or efficient long-range flight at speeds greater than the current state of the art for VTOL flight vehicles. The oblique rotor-wing aircraft described herein may have potential for supersonic capabilities. The oblique rotor-wing aircraft design is applicable to a wide variety of fuselage configurations and power plants. By way of non-limiting example, the oblique rotor-wing aircraft may be a battery electric flight vehicle. The oblique rotor-wing aircraft may incorporate stability control via multi-axis thrust vectoring provided by a thrust vectored propulsion system comprising one or more propulsion systems. This may eliminate asymmetric responses provided by traditional wing flaps that proved problematic on previous attempts at oblique wing flight, as well as control coupling issues that hampered earlier efforts at transitioning between flight modes in rotor-wing VTOL vehicles. In some implementations, the rotor-wing may be operated via compressed air and/or nitrogen to provide a low-noise rotor operation wherein the compressed air and/or nitrogen may be fed to wide nozzles on the rotor-wing. This, and/or other configurations described herein, may reduce torque loads on the rotary joint and/or the rotor assembly typically caused by direct shaft drive. This configuration, and/or other configurations described herein, may allow for a rotor-wing comprised of a highly stiff composite material with reduced loads imparted to the rotary joint in powered, autorotation, and locked positions, and/or no need to use heavy high-temperature materials. Compressed air may be utilized by the thrust vectored propulsion system (e.g., the rotor propulsion system) in a locked and/or fixed wing position to augment lift for forward flight (e.g., in a second flight mode and/or a third flight mode). This lift enhancement may enable use of a thin, high aspect ratio wing. In some implementations, compressed air may be used in a boundary layer control system which serves to reduce skin drag and/or regulate skin temperature in appropriate locations in the aircraft (e.g., such as leading edges). Another use of the compressed air may be for de-icing purposes.

The propulsion systems, flight vehicle (e.g., fuselage, materials, structure, and/or other aspects of the flight vehicle), rotor-wing, and/or other aspects of the oblique rotor-wing aircraft may be configured for high cruise performance rather than conventional takeoff and landing considerations because "dead weight" may be reduced and/or eliminated. The oblique rotor-wing aircraft design may enable one or more of the propulsion systems (e.g., a propulsion fan that generates forward propulsion for horizontal flight) to be sized smaller for cruise performance rather than takeoff power. The compressed fluid nozzles of the rotor-wing propulsion system may be repurposed for lift augmentation and/or drag reduction subsequent to takeoff, and/or as providing additional control authority. The rotor-wing of the oblique rotor-wing aircraft may be positioned and/or locked at an oblique angle relative to the direction of travel. The oblique angle of the rotor-wing relative to the direction of travel may change as the speed of the oblique rotor-wing aircraft increases into the transonic and supersonic regime in such a manner that improves and/or supports efficiency of the oblique rotor-wing aircraft.

The rotor-wing may be rotatably coupled to the fuselage of the oblique rotor-wing aircraft. The rotor-wing may rotate about an axis in a first flight mode for vertical takeoff and landing, and/or hovering. In some implementations, the oblique rotor-wing aircraft may comprise a rotor assembly. The rotor-wing may be rotatably coupled to the fuselage via the rotor assembly.

The rotor-wing may comprise a single continuous wing, multiple rotors, and/or other configurations. The rotor-wing may have multiple portions. The multiple portions may be portions of the single continuous wing and/or individual ones of the multiple rotors. The multiple portions may include a first portion that extends from a middle portion of the rotor-wing to a first end of the rotor-wing, a second portion that extends from the middle portion of the rotor-wing to a second end of the rotor-wing, and/or other portions. The first portion may have a first leading edge and/or a first trailing edge. The second portion may have a second leading edge and/or a second trailing edge. The first portion and/or the second portion may have an airfoil shape.

One or both of the first portion and/or the second portion of the rotor-wing may include a lift management system. The lift management system may effectuate a different shape of the airfoil for the first portion, the second portion, and/or another portion during horizontal flight, responsive to a change from the first flight mode to the second flight mode and/or the third flight mode. The lift management system may comprise one or more of a leading-edge flap, a trailing-edge flap, blown flap(s), and/or other lift management systems.

In some implementations one or both of the first portion and/or the second portion may include an airfoil augmentation mechanism. The airfoil augmentation mechanism may change a shape of the airfoil for the first portion and/or the second portion. The airfoil augmentation mechanism may change a shape of the airfoil during horizontal flight responsive to a change from the first flight mode to the second flight mode and/or the third flight mode. The airfoil augmentation mechanism may include one or more of a piston, an inflatable portion of the airfoil structure, an additional wing in addition to the rotor-wing, and/or another augmentation mechanism.

The thrust-vectored propulsion system of the oblique rotor-wing aircraft may comprise at least two propulsion systems. The propulsion systems may be separately operable. The at least two propulsion systems may include a rotor propulsion system that drives the rotation of the rotor-wing about the axis to generate vertical lift and/or provide horizontal propulsion, a fuselage propulsion system that is coupled to the fuselage to provide horizontal propulsion and/or vertical lift and/or thrust, and/or other propulsion systems. The thrust-vectored propulsion system may include one or more gimbaled nozzle(s). In some implementations, the fuselage propulsion system of the thrust-vectored propulsion system may include one or more gimbaled nozzles.

The rotor propulsion system may comprise one or more nozzles coupled to the first portion of the rotor-wing, the second portion of the rotor-wing, and/or other portions of the rotor-wing. One or more of the nozzles may include one or more of linear leading-edge nozzles, linear trailing-edge nozzles, wide aperture nozzles, localized nozzles, and/or other nozzles. By way of non-limiting example, a linear leading-edge nozzle and/or a linear-trailing edge nozzle may include a blown flap. One or more of the nozzles may facilitate flow provided by a compressor and/or a stored fluid. The stored fluid may include compressed air, compressed nitrogen, and/or another stored fluid.

The locking mechanism of the oblique rotor-wing aircraft may lock the rotor-wing at an angle oblique to the fuselage. In some implementations, the locking mechanism may be included in the rotor assembly. The locking mechanism may lock the rotor-wing at any corresponding angle oblique to the fuselage responsive to initiation of a second flight mode. As such, the rotor-wing may be fixed at an angle oblique to the fuselage in the second flight mode. Responsive to the rotor-wing of the oblique rotor-wing aircraft being fixed at the angle oblique to the fuselage, the rotor-wing may be asymmetrical with respect to a centerline of the fuselage. The flight speed of the oblique rotor-wing aircraft during the second flight mode may include one or more of high subsonic flight speed, transonic flight speed, supersonic flight speed, and/or other flight speeds.

Responsive to initiation of a third flight mode, the thrust-vectored propulsion system may drive the rotor-wing about the axis to an orthogonal position. The locking mechanism may lock the rotor-wing in an orthogonal position such that the rotor-wing is orthogonal to the fuselage. The flight speed of the oblique rotor-wing aircraft during the third flight mode may include a low-speed subsonic flight speed.

The thrust-vectored propulsion system of the oblique rotor-wing aircraft (e.g., including one of more of the rotor-wing propulsion system, the fuselage propulsion system, and/or any other propulsion systems) may be powered by one or more of batteries, an electric propeller, an electric fan, an electric compressor, a generator, fuel, and/or other power sources.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise. As used in the specification and in the claims, the distinctions "first", "second", and/or "third" are used for clarity and distinction purposes and do not indicate order unless the context clearly dictates otherwise.

BRIEF DESCRIPTION OF THE DRAWINGS

FIG. 1A illustrates a top view of an oblique rotor-wing aircraft capable of vertical take-off and landing, in accordance with one or more implementations.

FIG. 1B illustrates a side view of an oblique rotor-wing aircraft capable of vertical take-off and landing, in accordance with one or more implementations.

FIG. 8 illustrates a method for horizontal flight via an oblique rotor-wing aircraft capable of vertical take-off and landing, in accordance with one or more implementations.

DETAILED DESCRIPTION

Figure 2A:
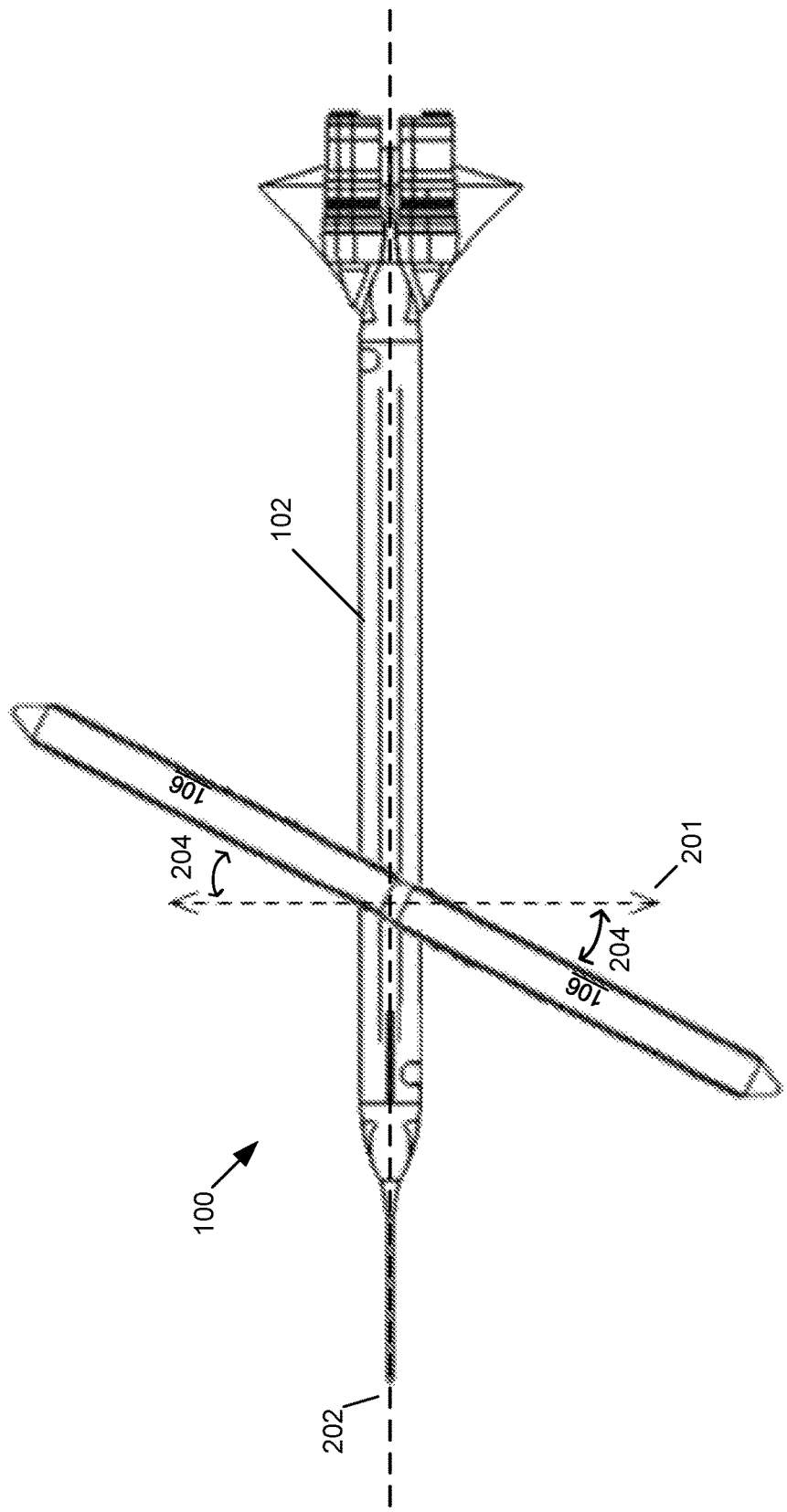
FIG. 2A illustrates a rotor-wing fixed at an angle moderately oblique to the fuselage, in accordance with one or more implementations.

FIG. 1 illustrates an oblique rotor-wing aircraft 100 capable of vertical take-off and landing. FIG. 1A illustrates a top view of oblique rotor-wing aircraft 100. FIG. 1B illustrates a side view of an oblique rotor-wing aircraft 100. FIGS. 1A and 1B are described herein as FIG. 1. Oblique rotor-wing aircraft 100 may be capable of high speed flight and/or have high hover capabilities. Oblique rotor-wing aircraft 100 may eliminate and/or reduce dead weight issues associated with typical high-speed VTOL designs by using rotor propulsion system 108 to provide vertical thrust and/or lift, and/or horizontal propulsion. Rotor propulsion system 108 may be used during takeoff, landing, and/or forward flight to reduce, minimize, and/or eliminate dead weight on the aircraft. Oblique rotor-wing aircraft 100 may enable more a efficiently sized and/or a relatively smaller horizontal propulsion system because vertical lift for takeoff may be generated by one or more of: rotor propulsion system 108, by re-directing the propulsion generated by fuselage propulsion system 110 vertically (or almost vertically), and/or by other propulsion systems and/or mechanisms (rather than just the fuselage propulsion system). The more efficiently-sized and/or relatively smaller fuselage propulsion system 110 enabled by oblique rotor-wing aircraft 100 may reduce the overall weight, and/or nonessential weight typically present on other high speed VTOL aircrafts that is only used during takeoff and/or landing. Oblique rotor-wing aircraft 100 may be more efficient than existing high speed VTOL aircraft.

Oblique rotor-wing aircraft 100 may include one or more of passenger aircraft, an unpiloted cargo aircraft, a piloted cargo aircraft, a manned aircraft, an unmanned aircraft, and/or other aircraft configured to transport people and/or items via flight, and/or perform other functions via flight. Oblique rotor-wing aircraft 100 may comprise a fuselage 102. Fuselage 102 may be the body of oblique rotor-wing aircraft 100. Fuselage 102 may have a variety of shapes, structures, and/or configurations as would be known to those skilled in the art. Fuselage 102 may be configured to store and/or transport passengers and/or cargo.

Oblique rotor-wing aircraft 100 may comprise a rotor-wing 106. Rotor-wing 106 may be rotatably coupled to fuselage 102. Rotatably coupled may indicate rotor-wing 106 is coupled to fuselage 102 such that rotor-wing 106 may rotate 360 degrees about an axis at various speeds. Rotor-wing 106 may be rotably coupled to fuselage 102 such that it rotates about axis 104 (see FIG. 1B). The rotor speed may indicate how many rotations rotor-wing 106 completes per unit of time. Rotor-wing 106 may rotate about axis 104 in a first flight mode. The first flight mode, for example, may include one or more rotary and/or helicopter flight mode(s) wherein one or more rotary wing(s) and/or rotary blades revolve around an axis generating lift and/or thrust. The rotation of rotor-wing 106 about axis 104 may generate aerodynamic lift and/or thrust. Oblique rotor-wing aircraft 100 may use the first flight mode for vertical takeoff and landing.

Oblique rotor-wing aircraft 100 may comprise a thrust-vectored propulsion system. The thrust vectored propulsion system may drive the rotation of rotor-wing 106 about axis 104. The thrust vectored propulsion system may comprise one or more propulsions systems. The one or more propulsion systems may be independent and/or separately operable. As used herein, "separately operable" may mean that individual ones of the one or more propulsion systems may be independently controlled and/or operated differently at different points during flight. As such, an individual one of the propulsion systems may generate a first amount of propulsion, thrust, and/or lift in one direction, while another individual one of the propulsion systems generates a second amount of propulsion, thrust, and/or lift in the another direction and/or the same direction. The one or more propulsion systems may include a rotor propulsion system 108, a fuselage propulsion system 110, and/or other propulsion systems that generate horizontal propulsion, vertical lift, and/or thrust. Rotor propulsion system 108 and/or fuselage propulsion system 110 may be separately operable such that individual ones of rotor propulsion system 108 and/or fuselage propulsion system 110 may operate independently and/or be controlled separately. As such, rotor propulsion system 108 may generate more, less, and/or equal amounts of propulsion, lift, and/or thrust as fuselage propulsion system 110 during one or more of: takeoff, landing, cruise, first flight mode, second flight mode, third flight mode, and/or the transition between one or more phases of flight and/or flight modes. In some implementations, the one or more propulsion systems may overlap such that rotor propulsion system 108 may perform one or more functions (e.g., described herein) of fuselage propulsion system 110, and/or fuselage propulsion system 110 may perform one or more functions of rotor propulsion system 108. The thrust-vectored propulsion system may be a single propulsion system having one or more separately operable portions. By way of non-limiting example, a single thrust-vectored propulsion system may be located in rotor wing 106, and a fixed propeller (e.g., without thrust vectoring) may be located in the rear of the fuselage 102.

A problem and/or cause of failure in previously existing stop rotor designs may include the propulsion mechanism being singular and/or not independently operable. As such, during the transition from a rotor to a fixed orthogonal wing, it was not possible in previously existing designs to obtain the control authority required for stable flight while the rotor-wing was being slowed. Also, in previously existing designs, increases in engine thrust to offset loss of rotor lift were not possible because they would lead to a corresponding increase in airflow to the rotor. As such, in previously existing designs, the rotor may become useless for the time period during which the rotor has to be slowed before it can be stopped, causing a drastic reduction in lift of the aircraft without a sufficient countervailing control force. The present disclosure solves this problem by decoupling lift generation from forward propulsion via the multiple, separately operable propulsion systems. Additionally, the decoupling may lead to a moment arm effect wherein vectored thrust provided from an aft-mounted propulsion system (e.g., fuselage propulsion system 110) can counteract the momentary unbalance caused by loss of lift in the forward rotor (e.g., rotor-wing 102). In previously existing rotor-wing systems in which a rotor may lock orthogonally (when transitioned from a rotor to a fixed-wing), the loss of lift described above will be followed by a large nose pitching moment as lift suddenly increases. Vectored thrust in both the rotor wing propulsion system 110 (e.g., one or more nozzles, etc.) and the fuselage propulsion system 110 (e.g., which may be coupled to the aft of the fuselage) can work to counteract this pitching to maintain smooth flight. This propulsion decoupling is further aided by locking the wing in a lower-lift oblique position initially such that a sudden large increase in lift is avoided, and demands on the thrust vectored propulsion system to compensate for pitching are reduced.

Rotor propulsion system 108 may be rotatably coupled to fuselage 102 via any suitable design that enables rotor-wing 102 to rotate about axis 104 in a first flight mode, and/or to transition between one or more of the first flight mode, the second wing flight mode, the third flight mode, and/or other flight modes. For example, rotor-wing 102 may be coupled to fuselage via rotor assembly 114. Rotor assembly 114 may include one or more mechanisms and/or parts known in the art to facilitate rotation of rotor-wing 106 about axis 104 in a first flight mode and/or to transition between one or more of the first flight mode, the second flight mode, the third flight mode, and/or other flight modes. By way of non-limiting the example, rotor assembly 114 may include one or more of a rotor shaft, a rotary joint, bearings, a swash plate, a mast, a rotor hub, magnetic rotating joint (e.g., a magnetic rotor assembly), mechanical bearing, air bearings, fluid bearings actuators, a braking mechanism (such as mechanical disk or drum brakes, fluidic dampers, electrical regenerative braking, and/or other braking mechanisms), a locking mechanism (e.g., locking mechanism 112) and/or other parts and/or mechanisms.

Locking mechanism 112 may lock rotor-wing 106 in a fixed wing position. For example, locking mechanism 112 may lock rotor-wing in one or more positions relative to the fuselage. Rotor-wing 106 may be locked in one or more positions by locking mechanism 112 during one or more flight modes. Locking mechanism 112 may lock rotor-wing 106 at an angle oblique to fuselage 102. Locking mechanism 112 may lock rotor-wing 106 at the angle oblique to fuselage 102 responsive to initiation of a second flight mode. As such, rotor-wing 106 may be fixed at the angle oblique to the fuselage during a second flight mode.

In some implementations, locking mechanism 112 may lock rotor-wing 106 in one or more positions. The one or more positions may include one or more oblique position(s), an orthogonal position, and/or other positions. The oblique position(s) may indicate rotor-wing 106 is fixed and an angle oblique to fuselage 102. When fixed at an angle oblique to fuselage 102, rotor-wing 106 may be asymmetrical with respect to a longitudinal centerline of fuselage 102. The orthogonal position may indicate rotor-wing 106 is fixed at a position orthogonal to fuselage 102 (and/or substantially orthogonal to fuselage 102 such that one or more portions of rotor-wing 102 are orthogonal to fuselage 102). For example, locking mechanism 112 may stop rotor-wing 106 from rotating in the first flight mode and/or fix rotor-wing 106 in one or more positions corresponding to another flight mode initiated.

In some implementations, the thrust-vectored propulsion system may drive rotor-wing 106 about axis 104 from a current position and/or movement, to a fixed position corresponding to the initiated flight mode prior to locking mechanism 112 locking rotor-wing 106 in the position corresponding to the initiated flight mode. The thrust-vectored propulsion system that drives rotor-wing 106 about axis 104 into the position corresponding to the initiated flight mode may include one or more of a rotor propulsion system 108, a fuselage propulsion system 110, and/or other propulsion systems. By way of non-limiting example, rotor-propulsion system 108 may drive rotor-wing 106 about axis 104.

The rotor-wing position corresponding to a second flight mode may include an oblique position wherein rotor-wing 106 is fixed at an angle oblique to fuselage 102. The rotor-wing position corresponding to a third flight mode (e.g., an orthogonal wing flight mode) may include an orthogonal position wherein rotor-wing 106 is fixed at an angle orthogonal to fuselage 102. Responsive to initiation of the second wing flight mode, locking mechanism 112 may lock rotor-wing 106 such that rotor-wing 106 is fixed at an angle oblique to fuselage 102. Responsive to initiation of the third flight mode, locking mechanism 112 may lock rotor-wing 106 in an orthogonal position such that the rotor-wing is orthogonal to the fuselage.

In some implementations, locking mechanism 112 may lock rotor-wing 106 in one or more positions instantaneously and/or nearly instantaneously. Locking mechanism 112 may lock rotor-wing 106 via one or more braking and/or damper systems. As such, rotor-wing 106 may quickly transition from rotating to a fixed wing position, and/or from one fixed wing position to another fixed wing position. In some implementations, locking mechanism 112 and/or rotor propulsion system 108 may cause a gradual transition from a rotating rotor-wing to a fixed wing position, and/or from one fixed wing position to another. For example, rotor propulsion system 108 may cause rotor-wing 106 to rotate about axis 104 incrementally, gradually, and/or in another controlled manner until locking mechanism 112 locks rotor-wing 106 into the one or more fixed wing positions corresponding to one or more flight modes. As such that the transition of rotor-wing 106 from one position to another, responsive to initiation of a change in flight mode, may be gradual.

Locking mechanism 112 may include one or more mechanisms and/or parts suitable to stop the rotation of rotor-wing 106 and/or to lock rotor-wing 106 into one or more of an oblique position, an orthogonal position, and/or other fixed-wing positions. By way of non-limiting example, locking mechanism 112 may include one or more of a disc brake, a pin assembly, a frictional brake, an air brake, an electromagnetic brake, a detent assembly, and/or other brake, damper, and/or locking mechanism(s) and/or system(s) suitable for stopping the rotation of rotor-blade 106 and/or locking rotor-blade 106 into one or more of an oblique position (i.e., the rotor-wing being fixed at one or more angles oblique to fuselage 102), an orthogonal position (e.g., the rotor-wing being fixed at an angle orthogonal to fuselage 102), and/or other fixed wing positions. In some implementations, the fixed wing positions may be pre-determined such that individual ones of the fixed-wing positions correspond to specific pre-set locking positions. As such, locking mechanism 112 may lock rotor-wing 106 into one or more of the pre-set locking positions corresponding to the flight modes. To illustrate, a first locking position may correspond to a highly oblique rotor-wing position for a second flight mode, a second locking position may correspond to a moderately oblique rotor-wing position for a second flight mode, a third locking position may correspond to an orthogonal rotor-wing position for a third flight mode, and/or other locking positions may correspond to other fixed-wing positions for the various flight modes. By way of non-limiting example, rotor propulsion system 108 may drive rotor-wing 106 to one or more locking positions in a variety of sequences based on the flight plan.

In some implementations, locking mechanism 112 may lock rotor-wing 106 at any position along its path of rotation about axis 104. For example, locking mechanism 112 may lock rotor-wing 106 at any point within the 360 degree path of rotation. As such, the fixed-wing positions may not be limited to the pre-set locking positions. In some implementations, the position of rotor-wing 106 along its path of rotation may be selectable and/or adjustable by a pilot and/or flight control system. For example, the position of rotor-wing 106 may be adjusted to adjust lift and minimize drag. At relatively low subsonic flight speeds (e.g., any speed between 50 mph and 400 mph), an orthogonal position may lead to the highest relative lift and may generally be used by low speed aircraft. At higher subsonic speeds (e.g., any speed above 401 mph but below Mach 0.8), such as those encountered by cruising business jets and commercial jets, an effective balance between lift and drag is achieved by a moderately oblique wing (e.g., rotor-wing 106 having a moderately oblique rotor-wing position). At transonic and supersonic speeds (e.g., any flight speed at and/or above Mach 0.8) rotor-wing 106 having a highly oblique rotor-wing position may provide an advantageous configuration. Within these ranges, at individual speeds there may be a given wing position and/or angle that leads to an effective lift/drag ratio and/or positively impacts the lift/drag ratio. Rotor-wing positioning of oblique rotor-wing aircraft 100 may be adjusted for the speed at which the aircraft is traveling based on the speed, the lift/draft ratio, and/or other information. Unlike traditional fixed wing VTOL aircraft designs, an oblique wing allows for high lift at low speeds while retaining the ability to obtain supersonic top speeds by adjusting wing position. As such, an oblique wing position for the second flight mode may correspond to one or more pre-set lock positions, and/or one or more positions within a continuously selectable range of positions within its 360 degree path of rotation that fix rotor-wing 106 at an angle oblique to fuselage 102.

Figure 2B:
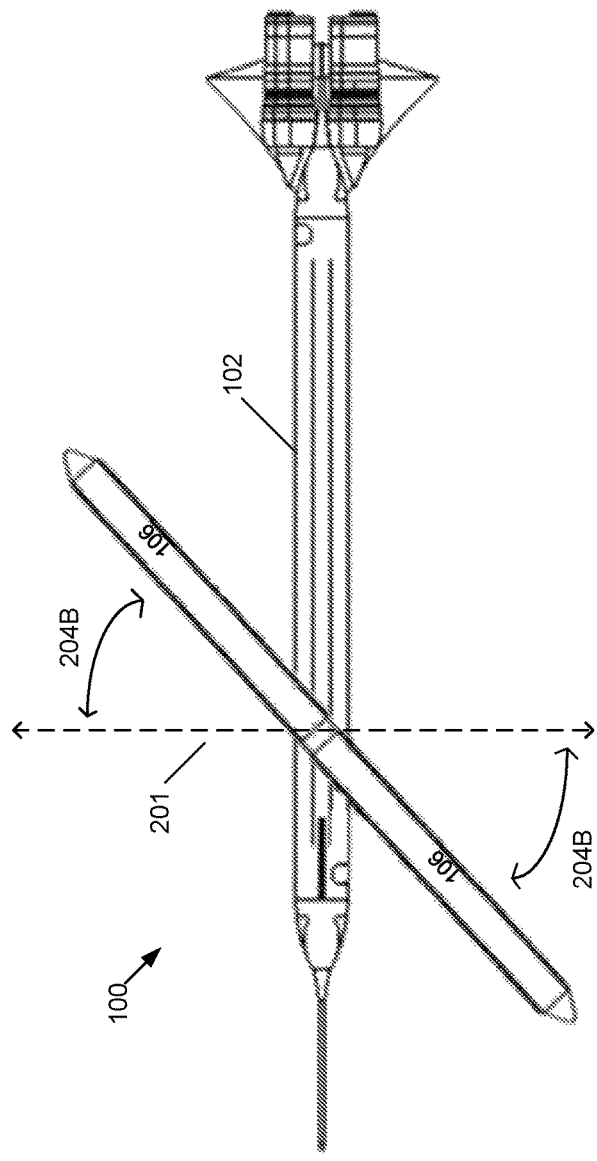
FIG. 2B illustrates a rotor-wing fixed at an angle moderately oblique to the fuselage, in accordance with one or more implementations.
Figure 2C:
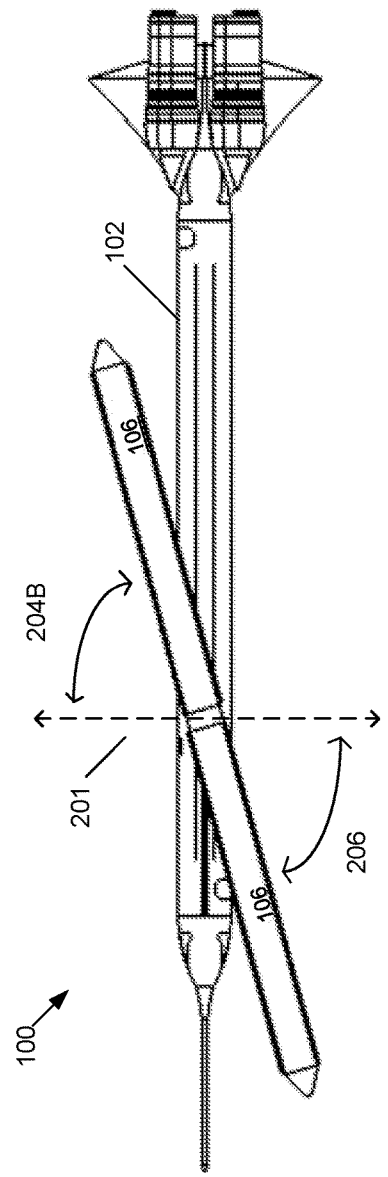
FIG. 2C illustrates a rotor-wing fixed at an angle highly oblique to the fuselage, in accordance with one or more implementations.
Figure 2D:
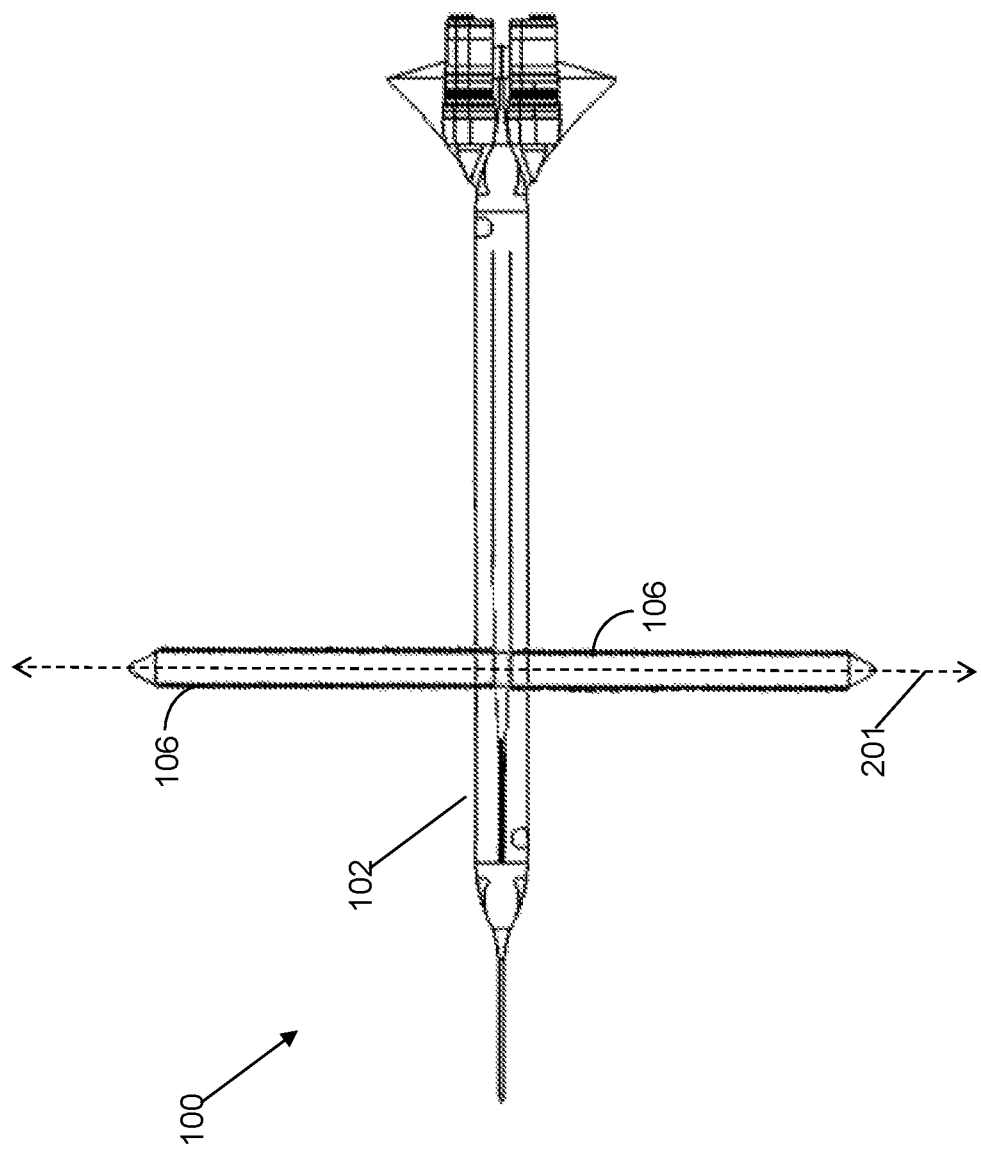
FIG. 2D illustrates a rotor-wing fixed at a position orthogonal to the fuselage, in accordance with one or more implementations.

FIGS. 2A-2C illustrate oblique rotor-wing aircraft 100 with rotor-wing 106 locked in various oblique wing positions such that rotor-wing 106 is fixed at various angles oblique to fuselage 102. Rotor-wing 106 may be asymmetrical with respect to a longitudinal centerline 202 of fuselage 102 in an oblique wing position. FIG. 2D illustrates oblique rotor-wing aircraft 100 with rotor-wing 106 locked in an orthogonal wing position such that rotor-wing 106 is fixed orthogonal to fuselage 102.

FIGS. 2A and 2B illustrate rotor-wing 106 fixed at angle 204 which is moderately oblique to fuselage 102, in accordance with one or more implementations. Angle 204 may measure anywhere between about 1 degrees and 50 degrees from a line 201, wherein line 201 is orthogonal to fuselage 102. By way of non-limiting example, the angle 204A (see e.g., FIG. 2A) may measure between 20 degrees and 40 degrees from line 201. By way of another non-limiting example, the angle 204B (see e.g., FIG. 2B) may measure between 30 and 50 degrees, and/or any other number of degrees between 1 degree and 50 degrees, from line 201. Rotor-wing fixed at angle 204 may indicate rotor-wing 106 is in a moderately oblique position. A moderately oblique position may include one or more positions where rotor-wing 106 is fixed at any angle between about 1 degree and 50 degrees. The moderately oblique wing-position may be used in the second flight mode during one or more of high subsonic flight (e.g., flight speeds greater than 400 mph but less than Mach 0.8), transonic flight (e.g., approximately Mach 0.8-1.2), low supersonic flight (e.g., approximately Mach 1.2-1.5), and/or other flight speeds.

FIG. 2C illustrates rotor-wing 106 fixed at angle 206 which is highly oblique to fuselage 102. Angle 206 may measure anywhere between about 51 degrees and 90 degrees from line 201, wherein line 201 is orthogonal to fuselage 102. By way of non-limiting example, the angle 206 may measure between 55 degrees and 75 degrees from line 201. By way of another non-limiting example, the angle 206 may measure between 65 degrees and 85 degrees from line 201. Rotor-wing fixed at angle 206 may indicate rotor-wing 106 is in a highly oblique position. A highly oblique wing position may include one or more positions where rotor-wing 106 is fixed at any angle between about 51 degrees and 90 degrees. The highly oblique wing-position may be used in the second flight mode during one or more of high supersonic flight speeds (e.g., flight speeds greater than Mach 1.5), a transition between the first flight mode (e.g., powered rotation of rotor-wing 106) to one or more fixed wing positions (e.g., an orthogonal wing position, a moderately oblique wing position, etc.) corresponding to one or more flight modes, and/or other similar flight speeds.

In some implementations, responsive to an initiation of the third flight mode and/or the second flight mode, the locking mechanism (not shown in FIGS. 2A-2D) and/or rotor propulsion system 108 may drive rotation of rotor-wing 106 and/or lock rotor-wing 106 in a highly oblique wing position. Rotor-wing 106 may be adjusted and/or driven to a highly oblique wing position during a transition between the first flight mode and another flight mode (e.g., third flight mode, second flight mode, and/or any other flight mode). Adjusting to a highly oblique wing position during the transition from a first flight mode and/or another flight mode may eliminate and/or reduce drawbacks associated with an immediate transition between a rotary rotor-wing in a first flight mode and a fixed rotor-wing orthogonal to the fuselage. For example, adjusting to the highly oblique wing position during the transition may prevent oblique rotor-wing aircraft 100 from encountering the problem of an extremely high pitch during the transition from vertical take-off to horizontal flight typically experienced by existing designs because the highly oblique wing position may better match the reduced lift of the slowed rotor. Existing stop-rotor designs that do not include an oblique wing configuration may have experienced flight issues during this transition from powered rotation of the rotor to a fixed orthogonal wing position due to the drastic transition in lift from a slowed rotor producing little or no lift to a fixed orthogonal wing after takeoff leading to a high pitching moment. Also, an obliquely positioned wing (e.g., a moderately oblique wing position, a highly oblique wing position, and/or other oblique wing position) could turn some of the pitching moment into a gradual turn which would more easily be counteracted by multiple onboard thrust vectoring systems (e.g., rotor propulsion system 108, fuselage propulsion system 110, and/or other propulsions systems) without exceeding aircraft pitch control limits.

FIG. 2D illustrates a rotor-wing fixed at a position orthogonal to the fuselage, in accordance with one or more implementations. Rotor-wing 106 may be fixed along line 201, orthogonal to fuselage 102. Orthogonal position may be used in the third flight mode during one or more of low subsonic flight speeds (e.g., any speed between 50 mph and 400 mph), a transition between the second flight mode to one or more other flight modes and/or fixed wing positions (e.g., an oblique wing position, a moderately oblique wing position, etc.).

Figure 3:
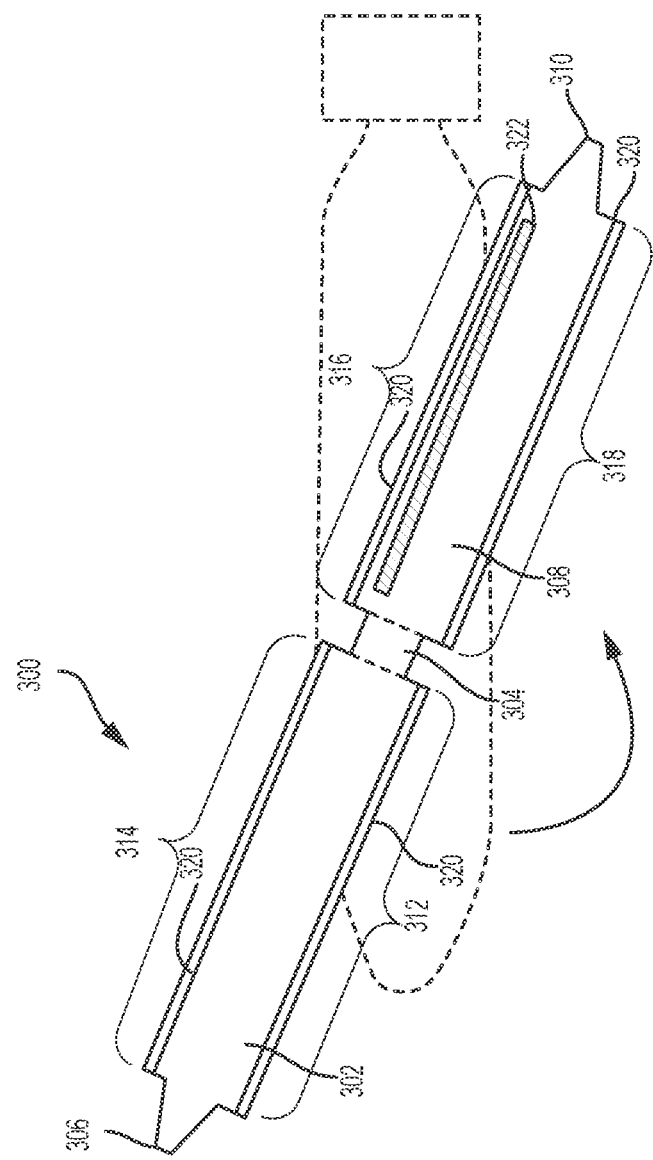
FIG. 3 illustrates a rotor-wing having multiple portions, in accordance with one or more implementations.

FIG. 3 illustrates a rotor-wing 300 having multiple portions, in accordance with one or more implementations. The multiple portions may include one or more of a first portion 302, a middle portion 304, a second portion 308, and or other portions. Rotor-wing 300 may comprise a continuous wing having representative portions; multiple segments, wings, and/or rotors coupled together to form the rotor-wing; and/or other wing configurations. For example, rotor-wing 300 may include two rotors (e.g., a first portion, and a second portion) coupled to a rotor hub. One or more portions of rotor-wing 300 may have an airfoil shape. Any variety of airfoil shapes known to those in the art may be suitable for rotor-wing 300. One or more portions of rotor-wing 300 may have a controllable pitch. Cyclic and/or collective pitch may be controlled a swashplate and/or other mechanisms known to those in the art controlled via flight controls of the oblique wing aircraft.

Rotor-wing 300 may comprise a continuous wing having multiple portions (e.g., a first portion 302, a middle portion 304, and a second portion 308). First portion 302 of rotor-wing 300 may extend from middle portion 304 to a first end 306 of rotor-wing 300. Second portion 308 of rotor-wing 300 may extend from middle portion 304 to a second end 310 of rotor-wing 300. During a first flight mode, first portion 308 may have a first leading edge 312 and/or a first trailing edge 314. Second portion 308 may have a second leading edge 316 and a second trailing edge 318 in the first flight mode.

In a third flight mode (e.g., an orthogonal-wing flight mode) and/or a second flight mode, where rotor-wing 300 is in a fixed wing position, one of first leading edge 312 or second leading edge 316 may be incorrectly positioned with respect to the direction of air flow over a portion of rotor-wing 300. To address the incorrect positioning of a portion of rotor-wing 300, rotor-wing 300 may include one or more lift management systems 320 that augment airflow over one or more portions of rotor-wing 300. Lift management systems 320 may enhance and/or reduce lift as required. In some implementations, one or more of first portion 302, second portion 308, middle portion 304, and/or other portions of rotor-wing 300 may include a lift management system 300. Lift management system 300 may effectuate a different shape of the airfoil for first portion 302, second portion 308, middle portion 304, and/or another portion of rotor-wing 300. For example, lift management system 300 may effectuate a different shape of the airfoil for first portion 302 and/or second portion 308 during horizontal flight responsive to a change from the first flight mode to the second flight mode and/or the third flight mode. Effectuating a different shape of the airfoil may augment the flow of air over the airfoil such that a trailing edge may be transformed into an effective leading edge. To illustrate, transitioning from a first flight mode to a third flight mode and/or to a second flight mode may cause a portion (e.g., half) of rotor-wing 300 to have an improper effective leading edge because the direction of flow over the portion (e.g., either first portion 302 or second portion 308) changes. As such, to continue to generate lift, one or more lift management systems may effectuate a different shape of the airfoil for a portion (e.g., first portion 302 or second portion 308) of rotor-wing 300.

Lift management system 320 may comprise one or more of a leading-edge flap, a trailing-edge flap, and/or any other lift management systems that effectuate a different shape of the airfoil for one of first portion 302 and/or second portion 308. The leading-edge flap and/or a trailing-edge flap may comprise a blown flap. The blown flap may rotate about an axis to change the physical shape of the airfoil in order to alter lift characteristics (e.g., and/or as otherwise may be understood in the art). This action may be further enhanced by fluid flow incorporated into the flap, extending the effective length of the flap, and/or increasing airflow over the upper surface of the wing.

In some implementations, in addition to or instead of a lift management system 320, the oblique rotor-wing aircraft may include an airfoil augmentation mechanism 322. One or more of first portion 302, second portion 308, middle portion 304, and/or another portion of rotor-wing 300 may include airfoil augmentation mechanism 322. Airfoil augmentation mechanism 322 may change the shape of the airfoil, the effective shape of the airfoil, and/or create a different airflow profile for the airfoil and/or one or more portions of the airfoil and/or of the rotor-wing 300. The airfoil augmentation mechanism may create a different airflow profile for first portion 302, second portion 308, middle portion 304, and/or another portion of rotor-wing 300 during horizontal flight. By way of non-liming example, airfoil augmentation mechanism 322 may be configured to inject air and/or fluid via one or more nozzles (e.g., the same as or similar to blown flap nozzle 400 illustrated in FIG. 4, and/or other nozzles) to create and/or alter an airflow profile of one or more portions (e.g., 302, 304, 308, etc.) of rotor-wing 300. Airfoil augmentation mechanism 322 may change the shape and/or the effective shape of first portion 302, second portion 308, middle portion 304, and/or another portion of rotor-wing 300 during horizontal flight. Airfoil augmentation mechanism 322 may create a different airflow profile for, and/or change the shape and/or the effective shape of one or more portions (e.g., 302, 304, 308, etc.) of rotor-wing 300 responsive to a change from the first flight mode to the second flight mode, the third flight mode, and/or another flight mode. Airfoil augmentation mechanism 322 may include one or more of a piston, an inflatable portion, an additional wing in addition to the rotor-wing (e.g., coupled to the fuselage of the oblique-rotor-wing aircraft and/or coupled to rotor-wing 300), and/or another airfoil augmentation mechanism that changes the shape and/or changes the effective shape of one or more portions of rotor-wing 300.

Returning to FIG. 1, oblique rotor-wing aircraft 100 may include a thrust-vectored propulsion system. The thrust-vectored propulsion system may generate thrust and/or propulsion having a direction that may be manipulated. The thrust vectored propulsion system may comprise multiple propulsion systems. The multiple propulsion systems included in the thrust vectored propulsion system may include one or more propulsion systems that are thrust vectored and/or one or more propulsion systems that are not thrust vectored. For example, the multiple propulsions systems may include at least two propulsion systems. The multiple propulsion systems may be separately operable such that individual ones of the propulsion systems may operate independently and/or be controlled separately from the other propulsion system. The thrust-vectored propulsion system may be powered at least partially by one or more of fuel, a propeller, a fan, a compressor, batteries, an electric propeller, an electric fan, an electric compressor, a generator (e.g., a gas turbine engine, internal combustion engine, a fuel cell, a genset, and/or other generators), and/or other power sources. By way of non-limiting example, one or more of the multiple propulsion systems of the thrust-vectored propulsion system may be an electric propulsion system, and/or a battery powered electric propulsion system. As such, oblique rotor-wing aircraft 100 may include batteries 116. Batteries 116 may be coupled to the interior and/or exterior of fuselage 102, coupled to oblique rotor-wing aircraft 100, form part of the structure of oblique rotor-wing aircraft 100, be contained within oblique rotor-wing aircraft 100, and/or otherwise be located on or within oblique rotor-wing aircraft 100.

By way of non-limiting example, a generator may be used to extend range and/or meet peak power demand to supplement one or more other sources of power (e.g., batteries, etc.). The generator may include one or more of fuel cells, micro turbines, internal combustion engines, and/or other engines using a variety of fuels. In some implementations, the generator may provide waste heat for nitrogen vaporization and/or anti-icing of oblique-wing aircraft 100.

The multiple propulsions systems may include one or more of a rotor propulsion system 108, a fuselage propulsion system 110, and/or other propulsion systems that produce propulsive force. The multiple propulsion systems may include rotor propulsion system 108 that drives rotor-blade 106 about axis 104 to generate lift. The multiple propulsion systems may include fuselage propulsion system 110 that produces forward thrust and/or propulsion to propel oblique rotor-wing aircraft 100 forward during forward flight. In some implementations, individual ones of the multiple propulsion systems may be both a vertical propulsion system and a horizontal propulsion system. To illustrate, rotor propulsion system 108 may drive rotor-wing 106 about axis 104 in a first flight mode during takeoff and/or landing by generating thrust opposite the direction of rotation of the rotor-wing. As such, rotor propulsion system may generate vertical lift and/or thrust. Rotor propulsion system 108 may provide horizontal propulsion in a third flight mode and/or a second flight mode when rotor-wing 106 is fixed by redirecting the thrust generated to be opposite the direction of horizontal flight. Fuselage propulsion system 110 may provide forward thrust to oblique-wing aircraft 100 in a third flight mode and/or an second flight mode when rotor-wing 106 is fixed. Fuselage propulsion system 110 may provide powered lift and/or vertical thrust to increase the lift of oblique-wing aircraft 100 in first flight mode during takeoff and/or landing via a thrust directing mechanism that temporarily directs the thrust generated by fuselage propulsion system 110 vertically.

The thrust vectored propulsion system including multiple propulsion systems may include a rotor propulsion system 108, a fuselage propulsion system 110, and/or other propulsion systems. Rotor propulsion system 108 may be a vertical propulsion system in a first flight mode, a horizontal propulsion system in one or more other flight modes, and/or another type of propulsion system. In some implementations, rotor propulsion system 108 may drive the rotation of rotor-wing 106 via shaftless actuation of rotor-wing 106. Rotor propulsion system 108 may produce thrust opposite the direction of the rotation of rotor-wing 106. Rotor propulsion system 108 may drive the rotation of rotor-wing 106 about axis 104.

Rotor propulsion system may, or may not be a propulsion system that is thrust vectored. By way of non-limiting example, the thrust vectored propulsion system may include a fuselage propulsion system that is thrust vectored, and/or a rotor propulsion system that is not thrust vectored. In some implementations, rotor propulsion system 106 may comprise an engine driving the rotation of rotor-wing 106 via a drive shaft (not pictured) coupled to rotor-wing 106 that actuates the rotation of rotor-wing 106. Other rotor propulsion systems may be suitable for driving rotor-wing 106 about axis 104 and would be known to those skilled in the art.

Rotor propulsion system 108 may comprise one or more nozzles coupled to rotor-wing 106. The one or more nozzles may be coupled to a first portion of rotor-wing 106 (e.g., the same as or similar to first portion 302 illustrated in FIG. 3), a second portion of rotor-wing 106 (e.g., the same as or similar to second portion 308 illustrated in FIG. 3), a first end of rotor-wing 106 (e.g., the same as or similar to first end 306 illustrated in FIG. 3), a second end of rotor-wing 106 (e.g., the same as or similar to second end 310 illustrated in FIG. 3), and/or another portion and/or end of rotor-wing 106. The one or more nozzles may drive rotor-wing 106 about axis 104 by generating thrust opposite the direction of rotation of rotor-wing 106. The one or more nozzles may drive rotor-wing 106 about axis 104 via a shaftless, low-friction rotor hub. In some implementations, the nozzles may include opposing nozzle pairs on the leading edge and trailing edge of one or more portions (e.g., a first portion, a second portion, and/or other portions) of rotor-wing 106. Nozzles may serve a multiple purposes. During forward flight, nozzles may be used for drag reduction and/or lift enhancement.

The one or more nozzles may include one or more of linear leading-edge nozzles, linear trailing-edge nozzles, jet nozzles, wide aperture nozzles, localized nozzles, and/or other nozzles. The linear leading-edge nozzles and/or linear trailing-edge nozzles may be coupled to the leading-edges and/or trailing edges of one or more portions of rotor-wing 106. The linear leading-edge nozzles and/or linear trailing-edge nozzles may include blown flaps. Leading and trailing edge flaps may adjust the shape and/or lift properties of the wing and/or provide flight control. Blown flaps may enhance this effect by increasing airflow over the upper surface of rotor-wing 106 and forestalling flow separation. The linear leading-edge nozzles and/or linear trailing-edge nozzles may extend the entire length or a partial length of one or more portions (e.g., the first portion, the second portion, the middle portion, and/or other portions) of rotor-wing 106. In some implementations, injecting air though one or more linear leading-edge nozzles and/or linear trailing-edge nozzles may help reduce boundary layer drag, prevent stalling of the airfoil at high angles of attack, and/or enhance lift.

In order to produce high torque during takeoff, higher speed airflow and/or nozzle openings with the ability to expand in size may be incorporated at the region of the nozzle closest to the tips (e.g., first end, second end, etc.) of rotor-wing 106. Said mode may be active during one or both of takeoff and landing when rotor-wing 106 is being rotated; and inactive during forward flight when rotor-wing 106 is in a fixed position as a wing.

In some implementations, wherein rotor propulsion system 108 comprises one or more nozzles, the one or more nozzles may include a compressor and/or a stored fluid. The compressor and/or the stored fluid may actuate and/or propel rotation of rotor-wing 106 in a first flight mode by generating thrust opposite the direction of rotation of rotor-wing 106. In a third flight mode and/or a second flight mode, the one or more nozzles may eject compressed air and/or stored fluid opposite the direction of travel to provide thrust for oblique rotor-wing aircraft 100 and/or to enhance properties of rotor-wing 106. In some implementations, the one or more nozzles may include nozzle vanes (e.g., a blown flap) that ensure compressed air flow remains opposite to the direction of vehicle travel regardless of the position or rotor-wing 106. The compressor may compress atmospheric air as a means of propulsion, and/or it may act on a combination of stored fluid and atmospheric air in some flight conditions (such as takeoff) where extra propulsive power is needed. The stored fluid may include one or more of compressed air, compressed or liquid nitrogen, and/or other stored fluid(s). In some implementations, the stored fluid may be used for other onboard and/or flight functions such as lift enhancement, drag reduction, anti-icing, cooling, inerting, and/or other functions.

Figure 4:
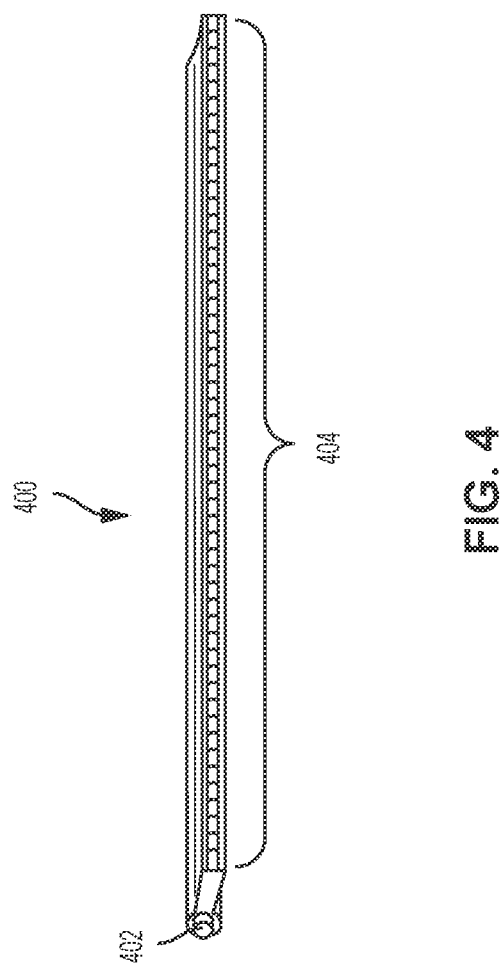
FIG. 4 illustrates a blown flap nozzle, in accordance with one or more implementations.

FIG. 4 illustrates a blown flap nozzle, in accordance with one or more implementations. Blown flap nozzle 400 may be coupled to one or more leading edges and/or trailing edges of one or more portions of the rotor-wing (e.g., the same as or similar to rotor-wing 106) via a joint 402. In some implementations, blown flap nozzle 400 may be one of multiple nozzles coupled to one or more ends, edges, and/or portions of the rotor wing. By way of non-limiting example, blown flap nozzle 400 may be one nozzle of a pair of blown flap nozzles coupled to one or more leading edges and/or trailing edges of one or more portions of the rotor-wing. Joint 402 may include a rotary joint and/or other suitable joints. Blown flap nozzle 400 may include vanes 404. Vanes 404 may comprise striations within blown flap nozzle 400 that direct flow out of the nozzle. For example, vanes 404 may include hollow shoots and/or passages through which air, gas, and/or fluid may flow. Vanes 404 may help prevent flow through blown flap nozzle 400 from becoming turbulent.

Returning to FIG. 1, fuselage propulsion system 110 may be a horizontal propulsion system, a vertical propulsion system (e.g., in a first flight mode), and/or another type of propulsion system. Fuselage propulsion system 110 may produce thrust opposite the direction of travel of oblique-rotor-wing aircraft 100 during the oblique wing-flight mode, the orthogonal wing-flight mode, and/or other flight modes. Fuselage propulsion system 110 may be coupled to fuselage 102. Fuselage propulsion system 110 may be coupled to fuselage 102 at one or more locations. By way of non-limiting example, fuselage propulsion system 110 may be coupled to the aft, rear, and/or tail end of fuselage 102. In some implementations, fuselage propulsion system 110 may be coupled to one or more wings, tails, and/or fins (not pictured) of oblique-wing aircraft 100. Fuselage propulsion 110 system may, or may not be a propulsion system that is thrust vectored. By way of non-limiting example, the thrust vectored propulsion system may include a fuselage propulsion system that is not thrust vectored, and/or a rotor propulsion system that is thrust vectored. Or, both fuselage propulsion system 110 and rotor propulsion system 108 may be thrust vectored propulsion systems.

Fuselage propulsion system 110 may include one or multiple of: a fan, an electric fan, a propeller, an electric propeller, a compressor, a turbine, a combustor, a mixer, a nozzle, a generator, a battery, and/or other components and/or mechanisms for providing thrust and/or propulsion. By way of non-limiting example, fuselage propulsion system 110 may include one or more electric propulsion fans. In some implementations, for example, fuselage propulsion system 110 may include one or more jet engines, combustion-driven ducted fans, and/or other engines and/or fans. Fuselage propulsion system 110 may be powered by one or more batteries, consumable fuel, and/or other sources of power. Fuselage propulsion system 110 may include a thrust-vectoring nozzle and/or a nozzle extension to direct thrust in various directions. As illustrated in FIG. 1A, fuselage propulsion system 110 may include two rear propulsion fans and/or thrust vectoring nozzles coupled to the tail end of fuselage 102.

Figure 5A:
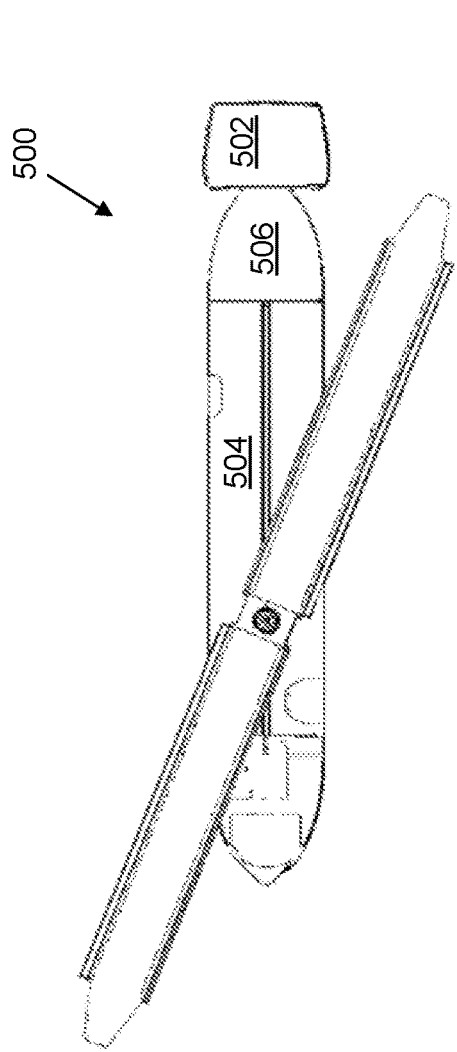
FIG. 5A illustrates a top view of an oblique rotor-wing aircraft, in accordance with one or more implementations.
Figure 5B:
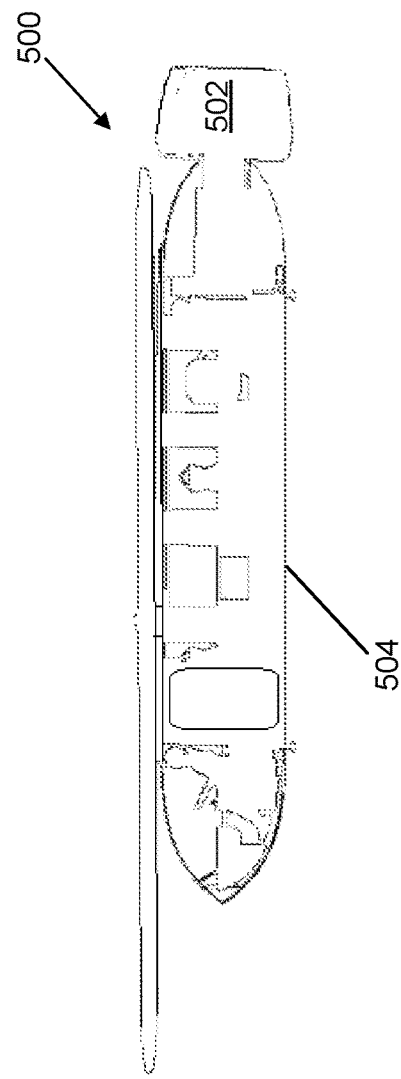
FIG. 5B illustrates a side view of an oblique rotor-wing aircraft, in accordance with one or more implementations.

FIGS. 5A and 5B illustrate an oblique rotor-wing aircraft 500, in accordance with one or more implementations. FIG. 5A illustrates a top view of an oblique rotor-wing aircraft 500, in accordance with one or more implementations. FIG. 5B illustrates a side view of an oblique rotor-wing aircraft 500, in accordance with one or more implementations. Oblique rotor-ring aircraft 500 may include a single propulsion fan 502. Single propulsion fan 502 may be coupled to a rear portion 506 of fuselage 504 of oblique rotor-wing aircraft 500.

Figure 6A:
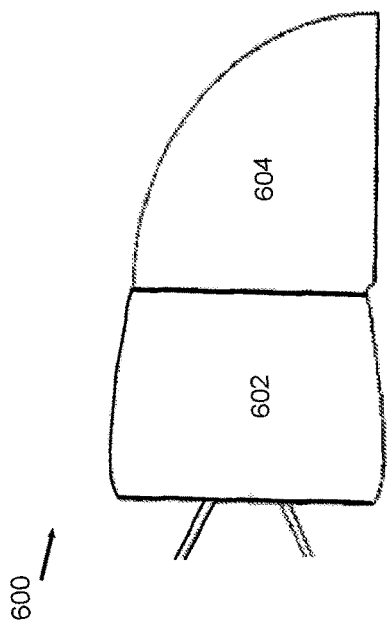
FIG. 6A illustrates a thrust-vectoring nozzle system during first flight mode, in accordance with one or more implementations.
Figure 6B:
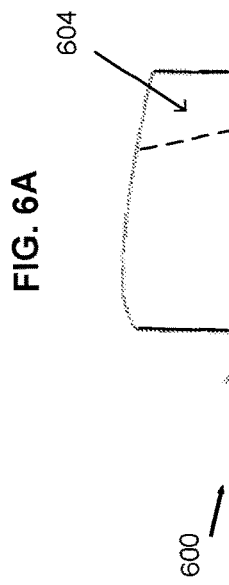
FIG. 6B illustrates a thrust-vectoring nozzle system during second flight mode and/or third flight mode, in accordance with one or more implementations.

FIGS. 6A and 6B illustrate a ducted fan thrust-vectoring nozzle system 600, in accordance with one or more implementations used for fuselage propulsion system. FIG. 6A illustrates thrust-vectoring nozzle system 600 during first flight mode, in accordance with one or more implementations in which fan thrust-vectoring nozzle system 600 is used to supplement the lift provided by the rotor wing. FIG. 6B illustrates a thrust-vectoring nozzle system 600 during second flight mode and/or third flight mode, in accordance with one or more implementations. Thrust-vectoring nozzle system 600 may include nozzle 602, nozzle extension 604, and/or other components. In some implementations, nozzle 602 may include a gimbaled nozzle. Nozzle extension 604 may direct thrust generated by the fuselage propulsion system and/or another propulsion system vertically and/or nearly vertically (e.g., see FIG. 6A). As such, nozzle extension 604 may direct thrust generated by the thrust-vectored propulsion system (e.g., the fuselage propulsion system, and/or other propulsion systems) to provide an additional source of powered lift to the oblique-wing aircraft. Nozzle extension 604 may be hingedly coupled to nozzle 602. Nozzle 604 may be accordion-like such that it may be locked in a retracted position (see e.g., FIG. 6B) during horizontal flight (e.g., an orthogonal-wing flight mode, a second flight mode, and/or another flight mode). In some implementations, nozzle 602 may include a low-temperature thrust vectoring nozzle such that nozzle extension 604 may comprise light, elastically deformable materials. In some implementations, electric actuators may control the shape and/or thrust vector direction of nozzle 602.

Figure 7:
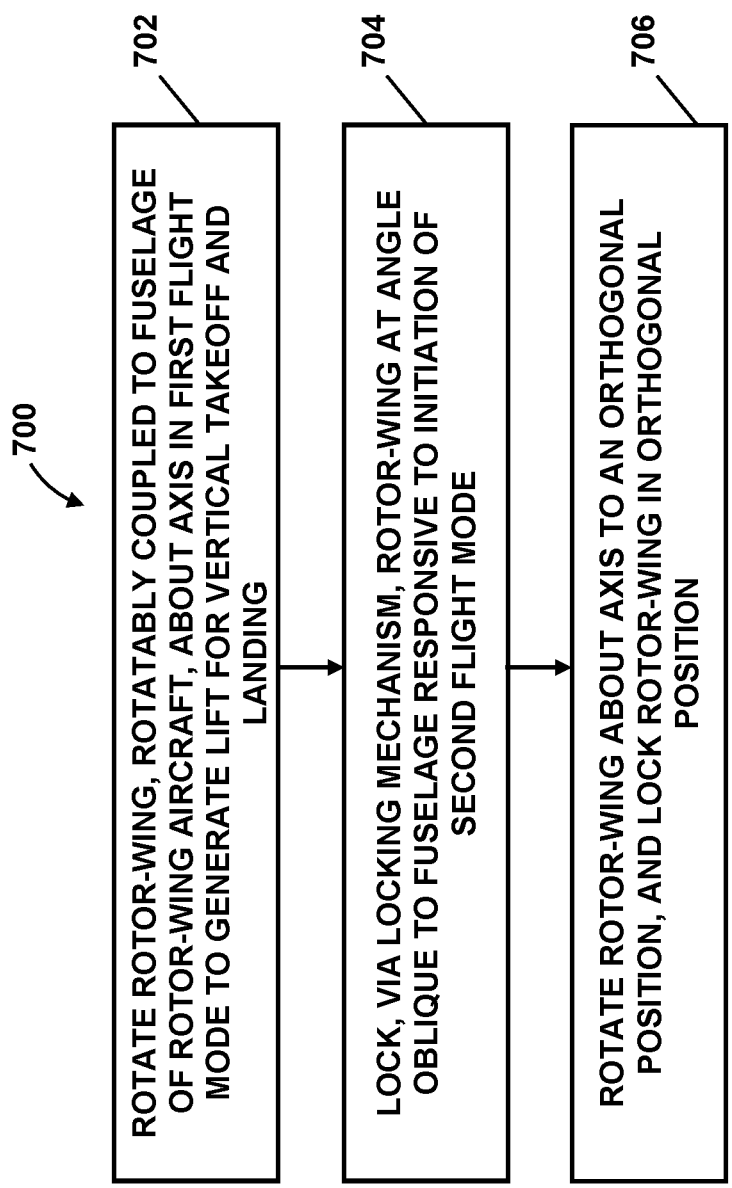
FIG. 7 illustrates a method for vertical take-off and landing, and horizontal flight via an oblique rotor-wing aircraft, in accordance with one or more implementations.

FIG. 7 illustrates a method for vertical take-off and landing, and horizontal flight via an oblique rotor-wing aircraft, in accordance with one or more implementations. The operations of method 700 presented below are intended to be illustrative. In some embodiments, method 700 may be accomplished with one or more additional operations not described, and/or without one or more of the operations discussed. Additionally, the order in which the operations of method 700 illustrated in FIG. 7 and described below is not intended to be limiting.

In some embodiments, method 700 may be implemented by one or more components of an oblique rotor-wing aircraft including. The one or more components of an oblique rotor-wing aircraft may include a fuselage, a rotor-wing, a thrust-vectored propulsion system (including a rotor propulsion system, a fuselage propulsion system, and/or other propulsion systems), a locking mechanism, and/or other components.

At an operation 702, a rotor-wing rotatably coupled to a fuselage of the rotor-wing aircraft may be rotated. The rotor-wing may be rotated about an axis. The rotor-wing may be rotated about the axis in a first flight mode to generate lift for vertical takeoff and landing. A thrust-vectored propulsion system of the rotor-wing aircraft may drive the rotation of the rotor-wing about the axis. In some implementations, operation 702 may be performed by a rotor-wing and/or a rotor propulsion system the same as or similar to rotor-wing 106 and/or rotor-propulsion system 108 (shown in FIG. 1A and described herein).

At an operation 704, the rotor-wing may be locked at an angle oblique to the fuselage. The rotor-wing may be locked at an angle oblique to the fuselage responsive to initiation of a second flight mode. As such, the rotor-wing may be fixed at the angle oblique to the fuselage. The rotor-wing may be locked by a locking mechanism. In some implementations, operation 704 may be performed by a locking mechanism the same as or similar to locking mechanism 112 (shown in FIG. 1B and described herein).

At an operation 706, the rotor-wing may be locked in an orthogonal position. Responsive to initiation of a third flight mode, the thrust-vectored propulsion system may rotate (e.g., drive) the rotor-wing about the axis to an orthogonal position. The rotor-wing may be locked in an orthogonal position such that the rotor-wing is orthogonal to the fuselage. The rotor-wing may be locked in a position orthogonal to the fuselage by a locking mechanism. In some implementations, operation 706 may be performed by a rotor-propulsion system and/or a locking mechanism the same as or similar to rotor-propulsion system 108 and/or locking mechanism 112 (shown in FIG. 1B and described herein).

FIG. 8 illustrates a method for method for horizontal flight via an oblique rotor-wing aircraft capable of vertical take-off and landing, in accordance with one or more implementations. The operations of method 800 presented below are intended to be illustrative. In some embodiments, method 800 may be accomplished with one or more additional operations not described, and/or without one or more of the operations discussed. Additionally, the order in which the operations of method 800 illustrated in FIG. 8 and described below is not intended to be limiting.

In some embodiments, method 800 may be implemented by one or more components of an oblique rotor-wing aircraft. The one or more components of an oblique rotor-wing aircraft may include a fuselage, a rotor-wing, a thrust-vectored propulsion system (including a rotor propulsion system, a fuselage propulsion system, and/or other propulsion systems), a locking mechanism, and/or other components.

At an operation 802, the rotor-wing may be rotated to an angle oblique to the fuselage. The rotor-wing may be rotated to the angle oblique to the fuselage responsive to transitioning from first flight mode to a second flight mode (e.g., a fixed wing position). The rotor-wing may be rotated to the angle oblique to the fuselage by a rotor propulsion system. In some implementations, operation 802 may be performed by a rotor propulsion system the same as or similar to rotor propulsion system 108 (shown in FIGS. 1A and 1B and described herein).

At an operation 804, the rotor-wing may be locked at the angle oblique to the fuselage. The rotor-wing may be locked at the angle oblique to the fuselage responsive to the rotor-wing being rotated to the angle oblique to the fuselage. The rotor-wing may be locked at the angle oblique to the fuselage by the locking mechanism. In some implementations, operation 804 may be performed by a locking mechanism the same as or similar to locking mechanism 112 (shown in FIGS. 1A and 1B and described herein).

At an operation 806, the rotor-wing may be rotated to an orthogonal position, orthogonal to the fuselage. The rotor-wing may be rotated to the orthogonal position responsive to a flight speed of the oblique rotor-wing aircraft being and/or transitioning to a low-speed subsonic flight speed. In some implementations, operation 806 may be performed by a rotor propulsion system the same as or similar to rotor propulsion system 108 (shown in FIGS. 1A and 1B and described herein).

At an operation 808, the rotor-wing may be locked in the orthogonal position. The rotor-wing may be locked in the orthogonal position responsive to a the rotor-wing being rotated to the orthogonal position. The rotor-wing may be locked in the orthogonal position by the locking mechanism. In some implementations, operation 808 may be performed by a locking mechanism the same as or similar to locking mechanism 112 (shown in FIG. 1B and described herein).

At an operation 810, the rotor-wing may be rotated to an angle oblique to the fuselage. The rotor-wing may be rotated to the angle oblique to the fuselage responsive to a flight speed of the oblique rotor-wing aircraft being and/or transitioning to one or more of high subsonic flight speed, transonic flight speed, and/or supersonic flight speed. The rotor-wing may be rotated to the angle oblique to the fuselage by a rotor propulsion system. In some implementations, operation 810 may be performed by a rotor propulsion system the same as or similar to rotor propulsion system 108 (shown in FIGS. 1A and 1B and described herein).

At an operation 812, the rotor-wing may be locked at the angle oblique to the fuselage. The rotor-wing may be locked at the angle oblique to the fuselage responsive to the rotor-wing being rotated to the angle oblique to the fuselage. The rotor-wing may be locked at the angle oblique to the fuselage by the locking mechanism. In some implementations, operation 812 may be performed by a locking mechanism the same as or similar to locking mechanism 112 (shown in FIGS. 1A and 1B and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. An oblique rotor-wing aircraft capable of vertical take-off and landing, the oblique rotor-wing aircraft comprising:
   a fuselage;
   a rotor-wing rotatably coupled to the fuselage, wherein the rotor-wing rotates about an axis in a first flight mode for vertical takeoff and landing;
   a thrust-vectored propulsion system that drives the rotation of the rotor-wing about the axis; and a locking mechanism that locks the rotor-wing at an angle oblique to the fuselage responsive to initiation of a second flight mode such that the rotor-wing is fixed at the angle oblique to the fuselage, wherein, responsive to initiation of a third flight mode, the thrust-vectored propulsion system drives the rotor-wing about the axis to an orthogonal position, and the locking mechanism locks the rotor-wing in the orthogonal position with the rotor-wing orthogonal to the fuselage, wherein, during a takeoff and ascent portion of a given flight, the locking mechanism locks the rotor-wing at an angle oblique to the fuselage in the second flight mode prior to locking the rotor-wing in the orthogonal position in the third flight mode such that transitioning from the rotor-wing rotating in the first flight mode to a fixed wing in the second flight mode and the third flight mode is facilitated and one or more issues with a sudden increase in lift when changing from the rotor-wing to the fixed wing are overcome.

2. The oblique rotor-wing aircraft of claim 1, wherein after initiation of the third flight mode in the takeoff and ascent portion of the given flight, the thrust-vectored propulsion system drives the rotor-wing about the axis to an oblique position and the locking mechanism locks the rotor-wing in the oblique position in the second flight mode, and wherein a flight speed of the oblique rotor-wing aircraft during the second flight mode includes one or more of high subsonic flight speed, transonic flight speed, and supersonic flight speed.

3. The oblique rotor-wing aircraft of claim 1, wherein a flight speed of the oblique rotor-wing aircraft during the third flight mode includes a low-speed subsonic flight speed.

4. The oblique rotor-wing aircraft of claim 1, wherein the thrust-vectored propulsion system comprises at least two propulsion systems that are separately operable, the at least two propulsions systems including a rotor propulsion system that drives the rotation of the rotor-wing about the axis and a fuselage propulsion system that is coupled to the fuselage to provide one or both of horizontal propulsion and vertical thrust.

5. The oblique rotor-wing aircraft of claim 1, further comprising a rotor assembly, wherein the rotor-wing is rotatably coupled to the fuselage via the rotor assembly, the rotor assembly including the locking mechanism.

6. The oblique rotor-wing aircraft of claim 1, wherein the rotor-wing has multiple portions, the multiple portions including a first portion that extends from a middle portion of the rotor-wing to a first end of the rotor-wing, and a second portion that extends from the middle portion of the rotor-wing to a second end of the rotor-wing, wherein the first portion has a first leading edge and a first trailing edge and the second portion has a second leading edge and a second trailing edge, and wherein the first portion and the second portion have an airfoil shape.

7. The oblique rotor-wing aircraft of claim 6, wherein one or both of the first portion and the second portion include a lift management system, the lift management system effectuating one or both of a first shape of the airfoil and creating a first airflow profile for the first portion or the second portion during horizontal flight responsive to one or both of a change from the first flight mode to the second flight mode and a change from the first flight mode to the third flight mode.

8. The oblique rotor-wing aircraft of claim 7, wherein the lift management system comprises one or more of a leading-edge flap, a trailing-edge flap, and blown flap.

9. The oblique rotor-wing aircraft of claim 6, wherein one or both of the first portion and the second portion include an airfoil augmentation mechanism, the airfoil augmentation mechanism changing an effective shape of the airfoil and creating a first airflow profile for the first portion or the second portion during horizontal flight responsive to a change from the first flight mode to the second flight mode or the third flight mode.

10. The oblique rotor-wing aircraft of claim 9, wherein the airfoil augmentation mechanism includes one or more of a piston, an inflatable portion of the airfoil structure, and additional wing in addition to the rotor-wing.

11. The oblique rotor-wing aircraft of claim 6, wherein the thrust-vectored propulsion system comprises at least two propulsion systems that are separately operable, the propulsions systems including a rotor propulsion system that drives the rotation of the rotor-wing about the axis via shaftless actuation of the rotor-wing, and wherein the rotor propulsion system comprises one or more nozzles coupled to one or both of the first portion of the rotor-wing and the second portion of the rotor-wing.

12. The oblique rotor-wing aircraft of claim 11, wherein one or more of the nozzles include one or more of linear leading-edge nozzles, linear trailing-edge nozzles, wide aperture nozzles, and localized nozzles.

13. The oblique rotor-wing aircraft of claim 11, wherein one or more of the nozzles control the output of one or both of a compressor and a stored fluid.

14. The oblique rotor-wing aircraft of claim 13, wherein the stored fluid includes one or more of compressed air, compressed nitrogen, and liquid nitrogen.

15. The oblique rotor-wing aircraft of claim 1, wherein the thrust-vectored propulsion system includes a gimbaled nozzle.

16. The oblique rotor-wing aircraft of claim 1, wherein the oblique rotor-wing aircraft includes one or more of a passenger aircraft, an unpiloted cargo aircraft, an unmanned aircraft, and a piloted cargo aircraft.

17. The oblique rotor-wing aircraft of claim 1, wherein the thrust-vectored propulsion system is powered at least partially by consumable fuel.

18. The oblique rotor-wing aircraft of claim 1, wherein the thrust-vectored propulsion system is powered at least partially by one or more of batteries, an electric propeller, an electric fan, an electric compressor, and a generator.

19. A method for vertical take-off and landing, and horizontal flight via an oblique rotor-wing aircraft, the method comprising:

rotating a rotor-wing, rotatably coupled to a fuselage of the rotor-wing aircraft, about an axis in a first flight mode to generate lift for vertical takeoff and landing, wherein a thrust-vectored propulsion system of the rotor-wing aircraft drives the rotation of the rotor-wing about the axis; and locking, via a locking mechanism, the rotor-wing at an angle oblique to the fuselage responsive to initiation of a second flight mode such that the rotor-wing is fixed at the angle oblique to the fuselage rotating the rotor-wing about the axis to an orthogonal position;

locking the rotor-wing in the orthogonal position such that the rotor-wing is orthogonal to the fuselage;

wherein, during a takeoff and ascent portion of a given flight, the rotor-wing is rotated to and locked at the angle oblique to the fuselage the prior to the rotor-wing being rotated to and locked in the orthogonal position such that transitioning from the rotor-wing rotating in the first flight mode to a fixed wing in the second flight mode and the third flight mode is facilitated and one or more issues with a sudden increase in lift when changing from the rotor-wing to the fixed wing are overcome.

* * * * *